United States Patent
Brenner et al.

(10) Patent No.: US 6,910,212 B2
(45) Date of Patent: Jun. 21, 2005

(54) SYSTEM AND METHOD FOR IMPROVED COMPLEX STORAGE LOCKS

(75) Inventors: Larry Bert Brenner, Austin, TX (US); Bimal Kiran Doshi, Austin, TX (US); Greg Robert Mewhinney, Austin, TX (US); James William Van Fleet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 09/729,894

(22) Filed: Dec. 4, 2000

(65) Prior Publication Data

US 2002/0078119 A1 Jun. 20, 2002

(51) Int. Cl.[7] .................................. G06F 9/00
(52) U.S. Cl. .................. 718/104; 707/3; 707/8; 707/9
(58) Field of Search .................. 718/100–108; 707/3, 8, 9; 709/100–108; 710/200–266; 714/1–25

(56) References Cited

U.S. PATENT DOCUMENTS

| | | | |
|---|---|---|---|
| 4,604,694 A | | 8/1986 | Hough .................. 364/200 |
| 5,490,270 A | * | 2/1996 | Devarakonda et al. ...... 707/201 |
| 5,761,659 A | * | 6/1998 | Bertoni .................. 707/8 |
| 5,872,909 A | * | 2/1999 | Wilner et al. ............ 714/38 |
| 5,966,543 A | | 10/1999 | Hartner et al. .......... 395/726 |
| 5,991,845 A | | 11/1999 | Bohannon et al. ......... 710/200 |
| 6,105,049 A | | 8/2000 | Govindaraju et al. ...... 709/102 |
| 6,105,050 A | | 8/2000 | Govindaraju et al. ...... 709/102 |
| 6,112,222 A | | 8/2000 | Govindaraju et al. ...... 709/102 |
| 6,112,282 A | | 8/2000 | Lynch .................. 711/145 |

* cited by examiner

*Primary Examiner*—Meng-Al T. An
*Assistant Examiner*—Anya Charles
(74) *Attorney, Agent, or Firm*—Joseph T. Van Leeuwen; Van Leeuwen & Van Leeuwen; Diana L. Roberts (57) ABSTRACT

An improved system and method for improving complex storage locks that manage access to a shared resource. A FIFO queue is maintained for processes waiting to read or write to the shared resource. When the shared resource is available, the first item is read from the queue. If the first item is a write requestor, the requestor is woken up in order to request the lock. If the first item on the queue is a read requestor, then that read requestor is woken up along with any other read requestors read from the queue until a write requestor is encountered or the end of the queue is reached. When the write wanted flag is set, new read requestors are denied access to the read lock, however any read requestors that were woken up in order to use the read lock are granted a read lock.

26 Claims, 8 Drawing Sheets

SYSTEM AND METHOD FOR IMPROVED COMPLEX STORAGE LOCKS

BACKGROUND OF THE INVENTION

1. Technical Field

The present invention relates in general to a method and system for improving complex storage locks. More particularly, the present invention relates to a system and method for improving the performance of complex storage locks with multiple readers and writers accessing an area within a computer system.

2. Description of the Related Art

The operating system is arguably the most important program that runs on a computer. Every general-purpose computer has an operating system in order to run other programs. Operating systems perform basic tasks, such as recognizing input from the keyboard, sending output to the display screen, keeping track of files and directories, and controlling peripheral devices such as disk drives and printers.

For large systems, the operating system has even greater responsibilities and powers. It makes sure that different programs and users running at the same time do not interfere with each other. The operating system is also responsible for security, ensuring that unauthorized users do not access the system.

Operating systems can be classified as (1) multi-user which allows two or more users to run programs at the same time (some operating systems permit hundreds or even thousands of concurrent users); (2) multiprocessing which supports running a program on more than one CPU; (3) multitasking which allows more than one program to run concurrently; (4) multithreading which allows different parts of a single program to run concurrently; and (5) real time which responds to input instantly. General-purpose operating systems, such as DOS and UNIX, are typically not real-time operating systems.

Operating systems provide a software platform on top of which other programs, called application programs, can run. The application programs are usually written to run on top of a particular operating system. The choice of which operating system to use, therefore, determines to a great extent the applications that can run.

The UNIX operating system is an interactive time-sharing operating system invented in 1969. The UNIX operating system is a multi-user, multi-tasking, and multi-threaded operating system supporting serial and network connected terminals for multiple users. UNIX may also be implementing in a multiprocessing environment with two or more processors executing in the computer system. UNIX is a multitasking operating system allowing multiple users to use the same system simultaneously. The UNIX operating system includes a kernel, shell, and utilities. UNIX is a portable operating system, requiring only the kernel to be written in assembler, and supports a wide range of support tools including development, debuggers, and compilers. Variations of the UNIX operating system exist and are provided by various vendors. For example, IBM provides the AIX™ operating system that has some features and improvements not found in general UNIX operating systems.

As a multi-user operating system, UNIX allows multiple people to share the same computer system simultaneously. UNIX accomplishes this by time-slicing the computer's central processing unit, or "CPU," into intervals. Each user gets a certain amount of time for the system to execute requested instructions. After the user's allotted time has expired, the operating system intervenes by interrupting the CPU, saving the user's program state (program code and data), restores the next user's program state and begins executing the next user's program (for the next user's amount of time). This process continues indefinitely cycling through all users using the system. When the last user's time-slice has expired, control is transferred back to the first user again and another cycle commences.

The UNIX operating system is both a multi-user operating system and a multi-tasking operating system. As the name implies, the multi-user aspect of UNIX allows multiple users to use the same system at the same time. As a multi-tasking operating system, UNIX permits multiple programs (or portions of programs called threads of execution) to execute at the same time. The operating system rapidly switches the processor between the various programs (or threads of execution) in order to execute each of the programs or threads. IBM's OS/2 and Microsoft's Windows 95/98/NT are examples of single-user multi-tasking operating systems while UNIX is an example of a multi-user multi-tasking operating system. Multi-tasking operating systems support both foreground and background tasks. A foreground task is a task that directly interfaces with the user using an input device and the screen. A background task runs in the background and does not access the input device(s) (such as the keyboard, a mouse, or a touch-pad) and does not access the screen. Background tasks include operations like printing which can be spooled for later execution.

The UNIX operating system keeps track of all programs running in the system and allocates resources, such as disks, memory, and printer queues, as required. UNIX allocates resources so that, ideally, each program receives a fair share of resources to execute properly. UNIX doles out resources using two methods: scheduling priority and system semaphores. Each program is assigned a priority level. Higher priority tasks (like reading and writing to the disk) are performed more regularly. User programs may have their priority adjusted dynamically, upwards or downwards, depending on their activity and the available system resources. System semaphores are used by the operating system to control system resources. A program can be assigned a resource by getting a semaphore by making a system call to the operating system. When the resource is no longer needed, the semaphore is returned to the operating system, which can then allocate it to another program.

Disk drives and printers are serial in nature. This means that only one request can be performed at any one time. In order for more than one user to use these resources at once, the operating system manages them using queues. Each serial device is associated with a queue. When a programs wants access to the device (i.e., a disk drive) it sends a request to the queue associated with the device. The UNIX operating system runs background tasks (called daemons), which monitor the queues and service requests for them. The requests are performed by the daemon process and the results are returned to the user's program.

Multi-tasking systems provide a set of utilities for managing processes. In UNIX, these are ps (list processes), kill (kill a process), and & at the end of a command line (run a process in the background). In UNIX, all user programs and application software use the system call interface to access system resources such as disks, printers, and memory. The system call interface in UNIX provides a set of system calls (C language functions). The purpose of the system call interface is to provide system integrity, as all low-level hardware access is under the control of the UNIX operating system and not the user-written programs. This prevents a program from corrupting the system.

Upon receiving a system call, the operating system validates its access permission, executes the request on behalf of the requesting program, and returns the results to the requesting program. If the request is invalid or the user does not have access permission, the operating system does not perform the request and an error is returned to the requesting program. The system call is accessible as a set of C language functions, as the majority of UNIX is written in the C language. Typical system calls are: _read—for reading from the disk; _write—for writing to the disk; _getch—for reading a character from a terminal; _putch—for writing a character to the terminal; and _ioctl—for controlling and setting device parameters.

As the name implies, the kernel is at the core of the UNIX operating system and is loaded each time the system is started, also referred to as a system "boot." The kernel manages the resources of the system, presenting them to the users as a coherent system. The user does not have to understand much, if anything, about the kernel in order to use a UNIX system. The kernel provides various necessary functions in the UNIX environment. The kernel manages the system's memory and allocates it to each process. It takes time for the kernel to save and restore the program's state and switch from one program to the next (called dispatching). This action needs to execute quickly because time spent switching between programs takes away from the time available to actually run the users' programs. The time spent in the "system state" where the kernel performs tasks like switching between user programs is the system overhead and should be kept as low as possible. In a typical UNIX system, system overhead should be less than 10% of the overall time.

The kernel also schedules the work to be done by the central processing unit, or "CPU," so that the work of each user is carried out efficiently. The kernel transfers data from one part of the system to another. Switching between user programs in main memory is also done by the kernel. Main system memory is divided into portions for the operating system and user programs. Kernel memory space is kept separate from user programs. When insufficient main memory exists to run a program, another program is written out to disk (swapped) to free enough main memory to run the first program. The kernel determines which program is the best candidate to swap out to disk based on various factors. When too many programs are being executed on the system at the same time, the system gets overloaded and the operating system spends more time swapping files out to disk and less time executing programs causing performance degradation. The kernel also accepts instructions from the "shell" and carries them out. Furthermore, the kernel enforces access permissions that are in place in the system. Access permissions exist for each file and directory in the system and determine whether other users can access, execute, or modify the given file or directory.

The fundamental structure that the UNIX operating system uses to store information is the file. A file is a sequence of bytes. UNIX keeps track of files internally by assigning each file a unique identification number. These numbers, called i-node numbers, are used only within the UNIX kernel itself. While UNIX uses i-node numbers to refer to files, it allows users to identify each file by a user-assigned name. A file name can be any sequence of characters and can be up to fourteen characters long.

Many operating systems, such as UNIX, manage shared resources, such as files, data structures, and devices, using storage locks. Storage locks prevent multiple processes from each altering a storage area at almost the same time resulting in a corrupted storage value. Storage locks include simple storage locks and complex storage locks. Simple storage locks allow one process to access the shared resource at a given time. Complex storage locks, on the other hand, allow either one writer or multiple readers to access the shared resource simultaneously. As the name implies, simple locks are generally simpler to implement and, as a result, are typically faster for shared resources that cannot benefit from the ability to support multiple simultaneous readers. Conversely, complex locks are more expensive (in terms of processing requirements) than simple locks and are slow when the number of writers is great in comparison with the number of readers. However, complex locks offer a performance advantage in situations where larger numbers of processes request to read a shared resource in comparison with the number of processes requesting to update the resource. By allowing multiple readers simultaneously, complex locks can typically dispose of large numbers of readers faster than simple locks.

A complex lock typically has three states: exclusive-write, shared-read, or unlocked. If several threads perform read operations on the resource, they first acquire the corresponding lock in shared-read mode. Since no threads are updating the resource, it is safe for all to read it. Any thread which writes to the resource first acquires the lock in exclusive-write mode. This guarantees that no other thread will read or write the resource while it is being updated.

Processes have priorities that determine their relative accessibility to a processor. When a lower priority thread owns a lock which a higher-priority thread is attempting to acquire, the owner has its priority promoted to that of the most favored thread waiting for the lock. When the owner releases the lock, its priority is restored to its normal value. Priority promotion ensures that the lock owner can run and release its lock, so that higher priority processes or threads do not remain blocked on the lock.

A linear hierarchy of locks exists. This hierarchy is imposed by software convention, but is not enforced by the system. The lockl kernel_lock variable, which is the global kernel lock, has the coarsest granularity. Other types of locks have finer granularity. The following list shows the ordering of locks based on granularity:

The kernel_lock global kernel lock;

File system locks (private to file systems);

Device driver locks (private to device drivers); and

Private fine-granularity locks.

Locks are generally released in the reverse order from which they were acquired; all locks are released before a kernel process exits or leaves kernel mode. Kernel mode processes generally do not receive signals while they hold a lock.

Complex locks are read-write locks which protect thread-thread critical sections. Complex locks may be preemptable, meaning that a kernel thread can be preempted by another, higher priority kernel thread while it holds a complex lock. Complex locks can also be spin locks; a kernel thread which attempts to acquire a complex lock may spin (busy-wait: repeatedly execute instructions which do nothing) if the lock is not free.

Atomic operations are sequences of instructions which guarantee atomic accesses and updates of shared resources. An operation that reads a shared resource (i.e. using a complex lock in read mode) and then wishes to update the shared resource with the data that was read left intact (i.e. no intervening writers updating the resource) is an atomic operation.

One challenge with the prior art occurs when the first process wishing to write to a shared resource currently held by a set of readers is put to sleep until the shared resource is available (i.e. released by the readers currently holding the lock). When the lock is available this specific writer is woken up to request the lock in write mode. The shared resource is unavailable to other requestors during the time it takes for previous lock holders to release their read locks and the first writer to be fully woken up, acquire, and release the lock.

Another challenge is that if write request is made after a reader is woken with the expectation of sharing a lock that is already held in read mode but before the reader has acquired a read lock, the reader is put back to sleep. Awakening and suspending processes uses system resources that could otherwise be used for processing.

A final challenge occurs when a writer sets the WANT WRITE indicator in the lock due to active readers. It causes readers that are awake and ready to update the shared resource to go to sleep rather than immediately acquire the lock.

What is needed, therefore, is a system and method for improving the management of the complex lock. In particular, what is needed is a system and method to more efficiently utilize the complex lock and increase the throughput of processes desiring to use the lock.

SUMMARY

It has been discovered that the complex lock can be improved by allowing a process that wishes to write to a lock to immediately receive the lock if the process has not yet been put to sleep and the lock becomes available. In this manner, the lock's utilization is increased over having to put the process to sleep and awaken a different writer that has been waiting on the lock.

It also has been discovered that readers that have been awoken in order to take part in a read lock should be allowed to have the read lock even if a writer requests the lock before all the readers acquire the lock. Performance is improved by awakening processes once rather than waking and re-suspending them in order to handle an intervening write request.

It has further been discovered that speeding up reader processes that currently own a lock (such as with a temporary exemption from priority based time-slicing) improves system performance. A temporary exemption allows the current readers to perform their processing faster and make the lock available to other processes waiting for the lock. A temporary exemption also reduces the probability that a low-priority reader will be time-sliced just after acquiring the lock so that the reader is more likely to release the lock in a timely fashion.

It has also been discovered that interleaving readers and writers in a FIFO fashion, and waking up sequentially located readers simultaneously (rather than processing all waiting writers and then waking up all waiting readers) offers performance improvements. Groups of readers are kept smaller so that the time it takes for each member of the group to finish reading is reduced. In addition, if the number of writers are increased a process waiting to read the shared resource is not forced to wait until all writers are finished writing to the shared resource.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
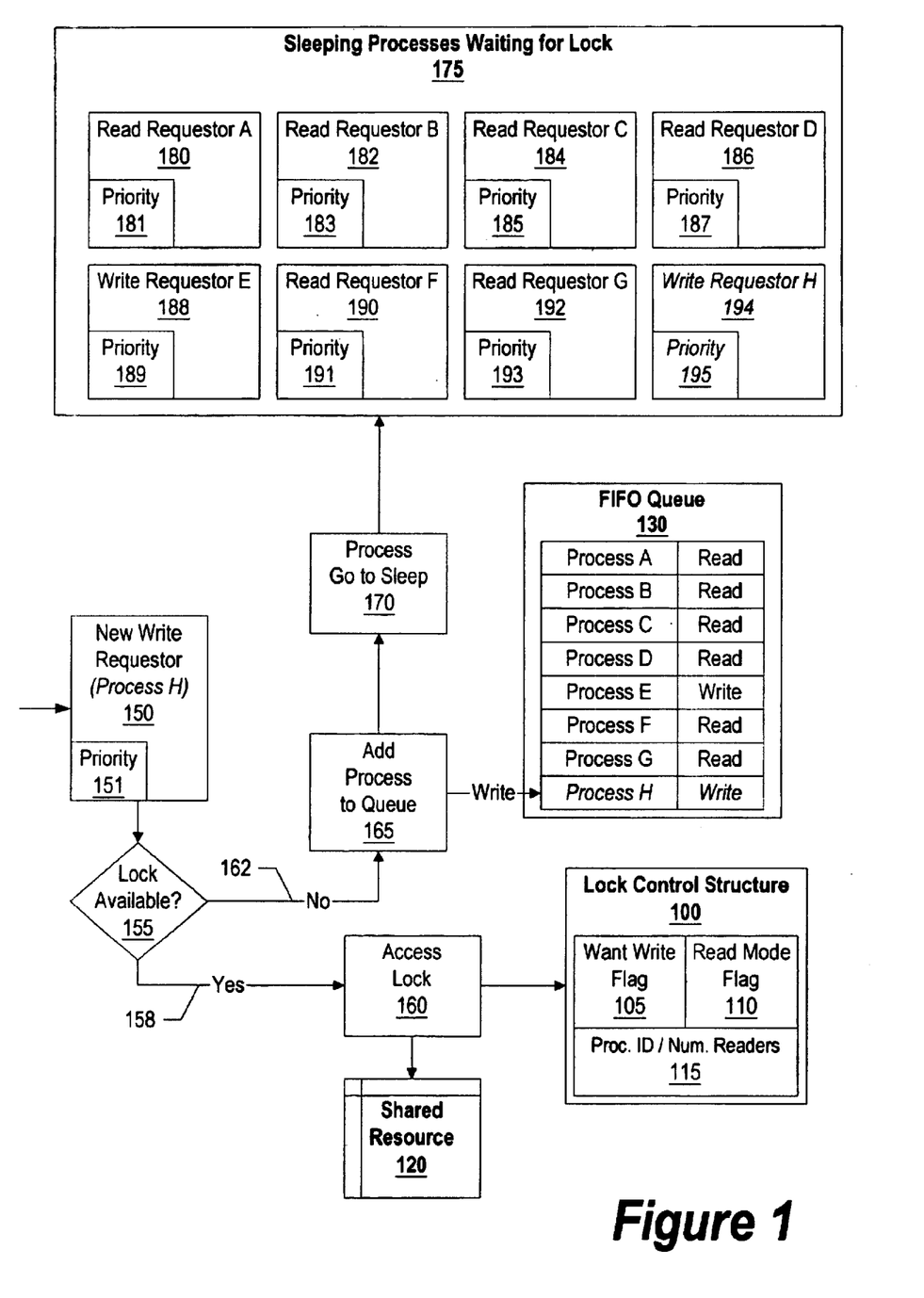
FIG. 1 is a system diagram showing components involved when writing to a resource using the complex lock.

FIG. 1 is a system diagram showing components involved when writing to shared resource 120 using the complex lock. Among other things, lock control structure 100 includes fields for keeping track of which process, or processes, currently hold the lock. Lock control structure 100 includes want write flag 105, read mode flag 110, and process id/number of readers field 115. Want write flag 105 is set when the lock is held by one or more readers and a writer has requested the lock. Read mode flag 110 is set when the lock is being held by one or more readers that are reading the shared resource. If read mode flag 110 is set, field 115 contains the number of readers currently using the lock and reading the shared resource. On the other hand, if read mode flag 110 is not set, field 115 contains the process id (or thread id) of the process currently holding the lock in write mode.

FIFO queue 130 is used to store information about the processes that are currently waiting for the shared resource. Processes may be requesting to read the resource (Read), write to the resource (Write), or upgrade the resource (R/W). As will be explained in further detail below, only one process in the queue may be an upgrader and this process is placed at the top of the queue regardless of when the request is made. All other requests (reads and writes) are placed in the queue in a FIFO (first in—first out) fashion.

Sleeping processes 175 shows those processes that are sleeping while waiting for the shared resource to become available. Note that each sleeping process corresponds with an item in the queue. Read requestor A (180) is in the first position of the queue; read requestor B (182) is in the second position of the queue; read requestor C (184) is in the third position of the queue; read requestor D (186) is in the fourth position of the queue; write requestor E (188) is in the fifth position of the queue; read requestor F (190) is in the sixth position of the queue; read requestor G (192) is in the seventh position of the queue; and new write requestor H (194) is in the eighth position of the queue. Each of the requestors have a priority, priority 181, priority 183, priority 185, priority 187, priority 189, priority 191, priority 193, and priority 195, respectively. Below we shall see how write requestor H (194) became the newest member of queue 130.

Process H is new write requestor 150. If the lock is presently available, decision 155 branches to "yes" branch 158 whereupon Process H would access the lock (step 160) thereby causing the fields within lock control structure 100 to be updated to reflect that Process H is using shared resource 120 in write mode.

On the other hand, and in the example shown in FIG. 1, the lock is not available so decision 155 branches to "no", branch 162 whereupon information about the process is added (step 165) to queue 130. The process then goes to sleep (step 170) where it joins sleeping processes 175 waiting for the lock. See FIG. 5 for further details regarding a process requesting a write lock to a shared resource.

Figure 2:
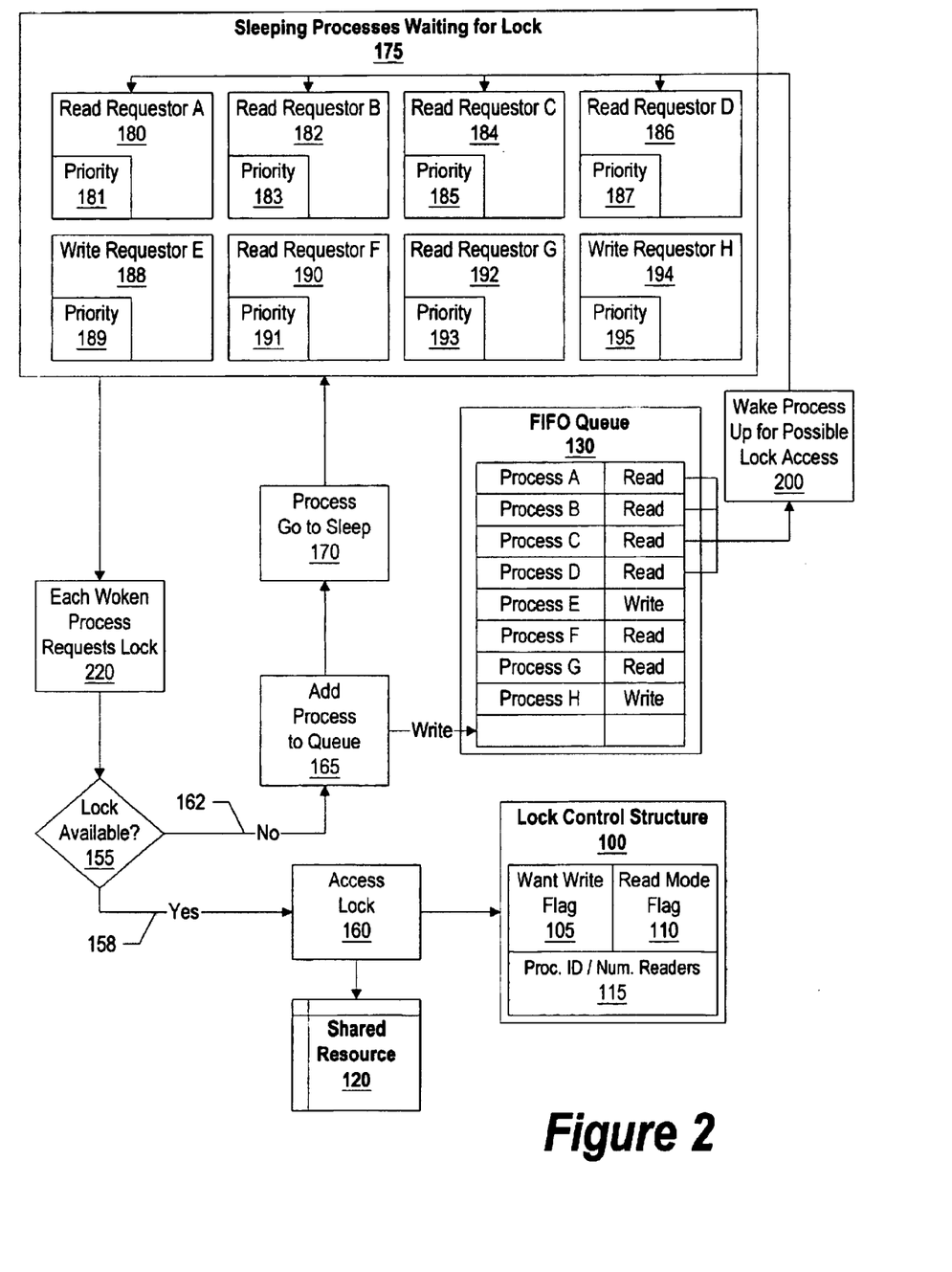
FIG. 2 is a system diagram showing components involved when reading a resource using the complex lock.

FIG. 2 is a system diagram showing components involved when handling processes that wish to read the lock. When the lock becomes available, the queue manager wakes up one or more processes that are waiting for the lock. In this case, the item at the top of queue 130 is Process A. As shown in FIG. 2, Process A is requesting a read lock to shared resource 120. A complex lock can have more than one reader accessing the shared resource simultaneously. The queue manager, therefore, processes queue 130 until the first writer is found. In the example shown, the first four waiting processes (Process A, B, C, and D) are requesting read locks to shared resource 120. Wakeup processes (step 200) therefore wakes each of these processes (Read Requestor A (180), Read Requestor B (182), Read Requestor C (184), and Read Requestor D (186)). Once each of these processes wakes up, they each individually request the lock (step 220). If the lock is available, decision 155 branches to "yes" branch 158 whereupon the lock is accessed (step 160) and information is written to lock control structure 100. If the reader is the first process to access the lock, read mode flag 110 is set and number of readers field 115 is set to one (1) reader. Subsequent readers cause number of readers field 115 to increment reflecting the number of readers with read locks to shared resource 120. If the lock is not available, decision 155 branches to "no" branch 162 whereupon the reader is added to the queue (step 165) and put to sleep (step 170). The lock may not be available for a waking reader if the process takes too long to wakeup and check to see whether the lock is available. For example, if Read Requestors A, B, and C each acquire and release the lock and an intervening write requestor (such as the one shown in FIG. 1) obtains the lock before Requestor D wakes up and checks whether the lock is available, Requestor D will not be able to access the lock and will be placed back on the queue of waiting processes. See FIG. 6 for further details regarding a process requesting a read lock to a shared resource.

Figure 3:
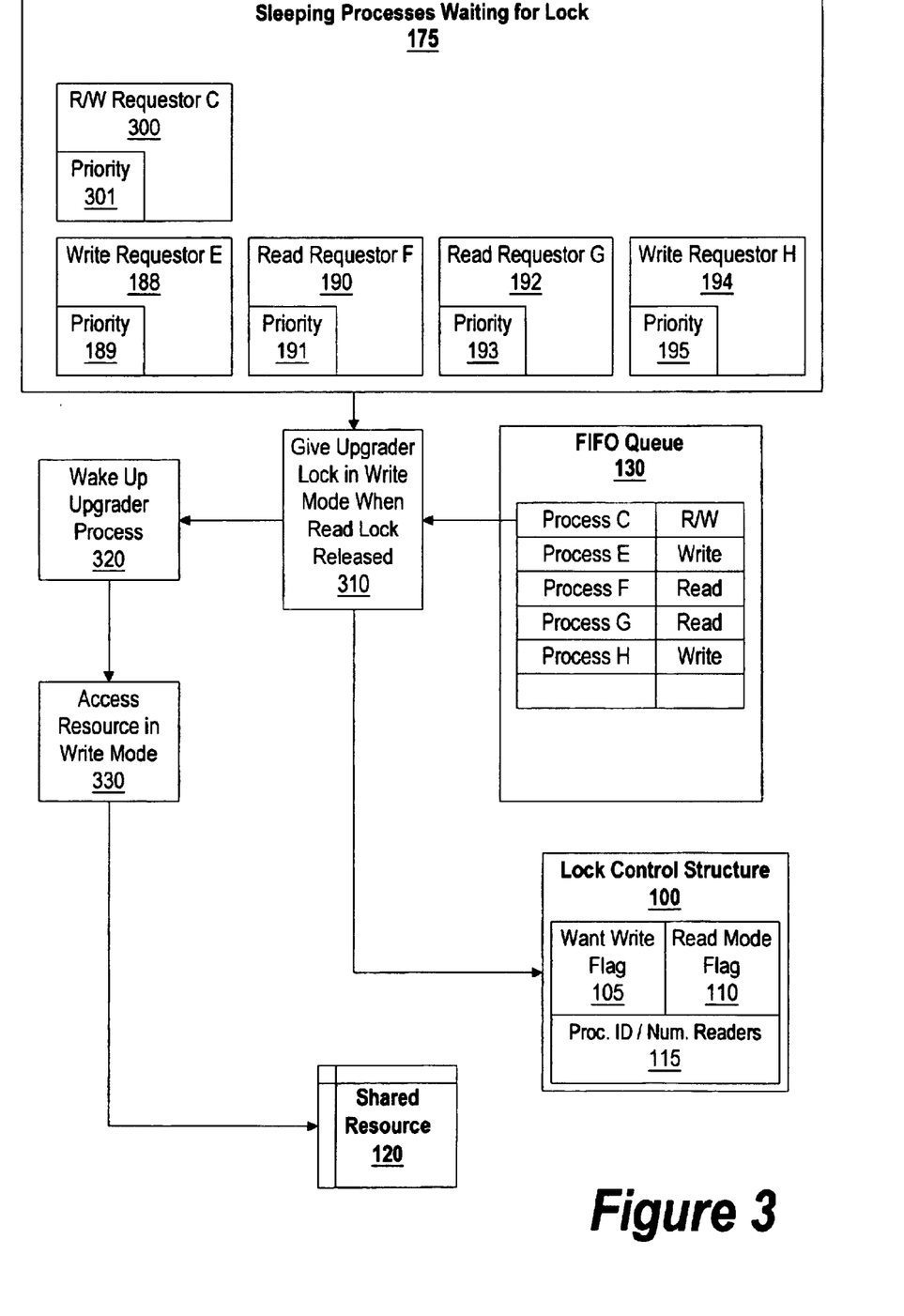
FIG. 3 is a system diagram showing components involved when acquiring the complex lock as an upgrader.

FIG. 3 is a system diagram showing components involved when acquiring the complex lock as an upgrader. In the example shown, Read Requestor C (Requestor 184 from FIG. 2) decided it wished to perform an atomic update of the contents it read during the processing shown in FIG. 2. Before releasing its read lock, Requestor C requested to atomically update the shared resource (i.e. by issuing a Read_2_Write instruction). If no other reader processes have requested to atomically upgrade the lock, process C's request is allowed. Only one process can atomically upgrade the lock because, by definition, the atomic upgrader is requesting to update the shared resource data that it just read. The atomic upgrader is added to the top of FIFO queue 130. When shared resource 120 is available (i.e. all outstanding read locks have been released), the lock manager gives the upgrader the lock in write mode (step 310) and removes the upgrader from FIFO queue 130. The lock manager also clears any read mode flag 110 that may be present in lock control structure 100 and enters the upgrader's process id in field 115 within lock control structure 100. The upgrader is woken up (step 320) and accesses (step 330) shared resource 120 in write mode. Note that the upgrader does not need to check whether the lock is available, unlike write requestors and read requestors shown in FIGS. 1 and 2, because the lock was given to the upgrader by the lock manager before the upgrader is awakened. See FIG. 7 for further details regarding a process requesting an atomic upgrade of a read lock.

Figure 4:
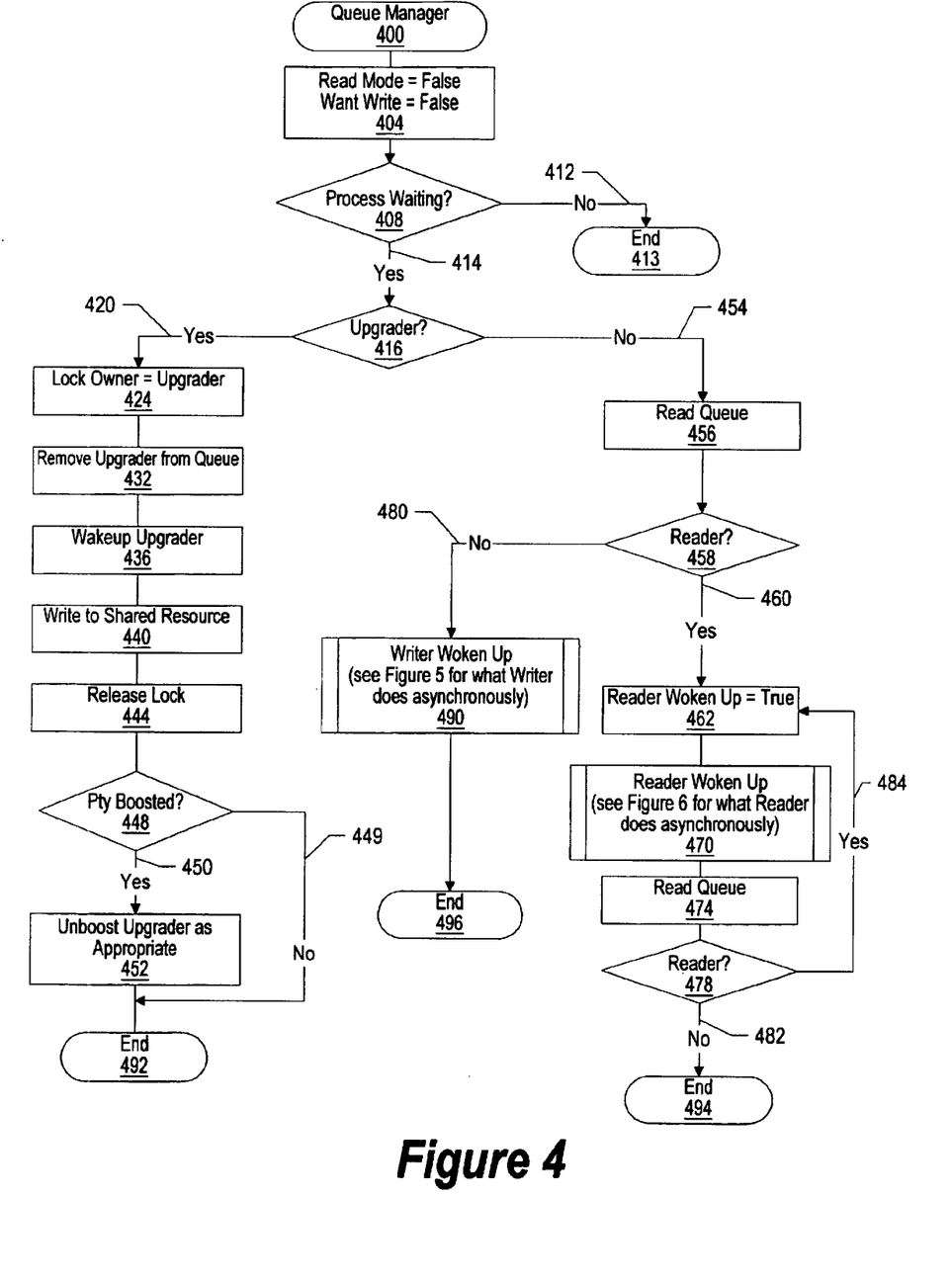
FIG. 4 is a flowchart showing the management of a queue of processes waiting to acquire a complex lock.

FIG. 4 is a flowchart showing the management of a queue of processes waiting to acquire a complex lock. Processing commences at 400 whereupon the read mode and want write flags are both set to false (step 404). A check is made as to whether any processes are waiting on the queue (decision 408). If there are no processes waiting on the queue, "no" branch 412 is taken whereupon processing ends at end 413. When there are one or more processes waiting on the queue, decision 408 branches to "yes" branch 414 in order to process one or more queued items. An upgrader process is placed at the top of the queue to ensure that no intervening processes are able to write to the shared resource and, thus, destroy the upgrader's atomic upgrade. If there is an upgrader, decision 416 branches to "yes" branch 420 for upgrader processing.

The lock owner within the lock control structure is set to the upgrader's process id (step 424). The upgrader is removed from the top position in the queue (step 432) and woken up (step 436). The upgrader now has the shared resource in write mode and is free to write data to the shared resource (step 440). When the upgrader is finished writing data to the shared resource, it releases the lock (step 444). A decision is then made as to whether the upgrader's priority was boosted while it held the lock (decision 448). If a write requestor with a higher priority requested the lock while the upgrader held the lock, the upgrader's priority was boosted in order for the upgrader to finish its use of the lock faster and release the lock for the higher priority writer (see FIG. 5, steps 555 to 560 for further boosting details). If the upgrader's priority was boosted, decision 448 branches to "yes" branch 450 whereupon the upgrader's priority is unboosted if it is appropriate to do so (step 452). One reason it may not be appropriate to unboost the upgrader's priority is if the upgrader holds additional write locks. If this is the case, it may be more efficient to system throughput to wait until all the upgrader's write locks are released before resetting the upgrader to its original priority. Another way to unboost the upgrader is to only unboost the upgrader to the extent the upgrader was boosted by writers waiting for the particular lock being released. If the upgrader's priority was not boosted, decision 448 branches to "no" branch 449 bypassing the unboosting step. The upgrader's processing completes at end 492.

Returning to decision 416, if the first process waiting on the queue is not an upgrader, decision 416 branches to "no" branch 454. The first item on the queue is read and removed from the queue (step 456). The read item is analyzed to determine whether the item is requesting a read or a write lock (decision 458). If the item is requesting to read from the shared resource, "yes" branch 460 is taken whereupon a flag is set indicating that this reader process was woken up from the queue (step 462). Indicating that the reader was woken up aids in handling an intervening writer request setting the "Want Write" flag in the lock control structure. When a reader process wants to join a read lock and the "Want Write" flag has been set, it normally is refused access to the lock whereupon it (re)enters the queue and goes (back) to sleep. Setting a reader woken up flag allows a prospective reader to join a read lock even when the "Want Write" flag has been set. Allowing readers that have been woken up for use of a read lock to access the lock instead of going to sleep again eliminates overhead involved in repeatedly putting readers to sleep and waking them up. The reader is woken up and asynchronously requests the lock (predefined process 470, see FIG. 6 for further details regarding the reader's asynchronous processing). It is important to note that just because the reader was woken up when the lock was available does not guarantee that the particular reader will immediately obtain a read lock to the shared resource. For example, a slow read process (i.e. one with a low priority) may request the lock after it has already been acquired by a writer (see FIG. 6 for further details). The next item on the queue is then read (step 474) to determine whether the next process is another reader. If the next process is another reader, decision 478 branches to "yes" branch 484 which removes the reader from the queue and loops back to wake up the reader (steps 462 and 470). This processing iterates until a writer is read from the queue or the queue has no more processes waiting. When this occurs, decision 478 branches to "no" branch 482. If a writer was encountered, it is left on the queue (not removed) so that it can be handled when the lock becomes available. Queue processing of readers completes at end 494.

Returning to decision 458, if the first process waiting on the queue is not a reader, decision 458 branches to "no", branch 480. The writer is woken up and asynchronously requests the lock (predefined process 490, see FIG. 5 for further details regarding the writer's asynchronous processing). It is important to note that just because the writer was woken up when the lock was available does not guarantee that the particular writer will immediately obtain a write lock to the shared resource. For example, a slow write process (i.e. one with a low priority) may request the lock after it has already been acquired by another writer or a reader (see FIG. 5 for further details). Queue processing of the writer completes at end 496.

Figure 5:
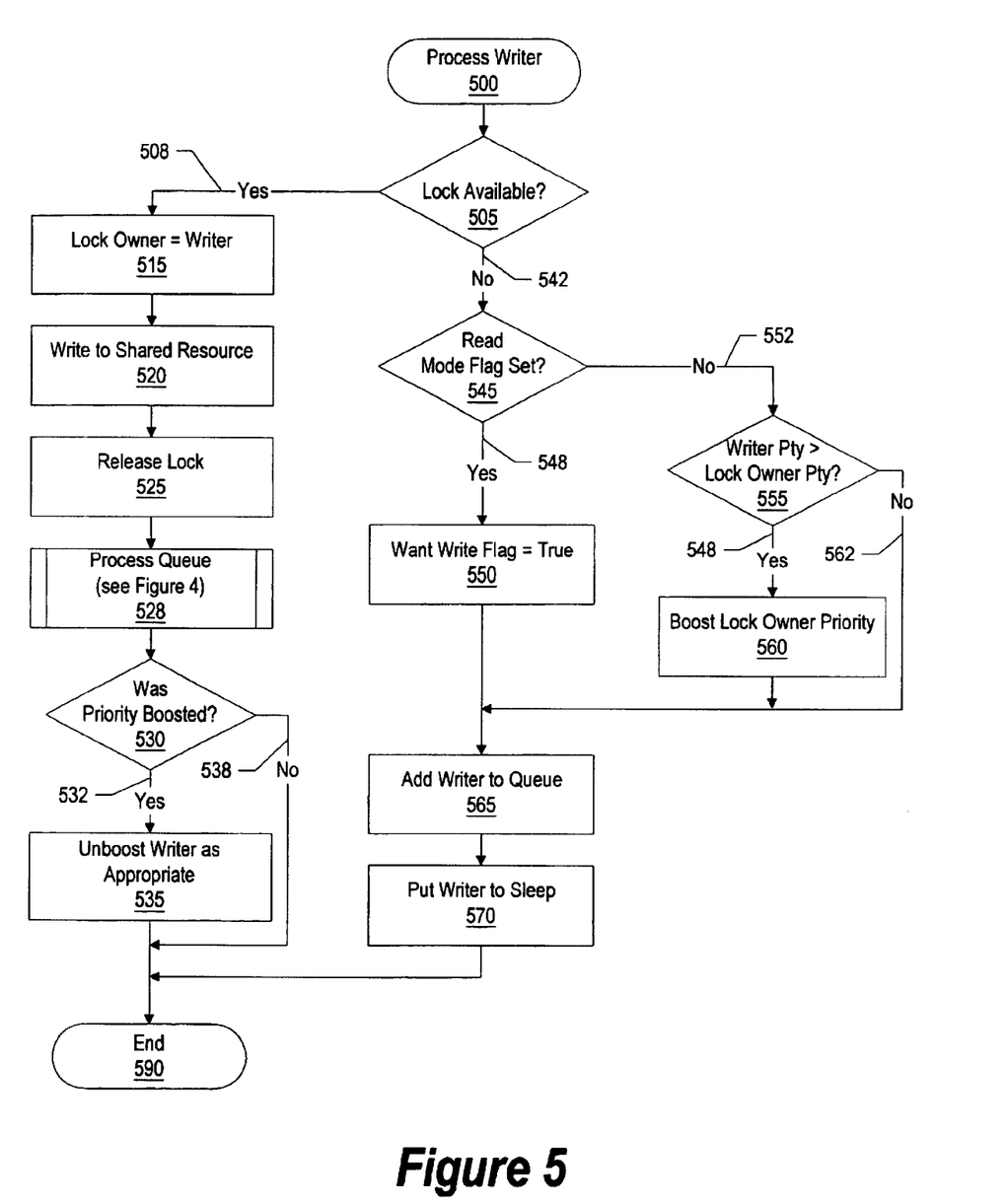
FIG. 5 is a flowchart for handling processes requesting to write to the shared resource.

FIG. 5 is a flowchart for handling processes requesting to write to the shared resource. It should be pointed out that both new requests for a write lock and those that have been awakened from the lock control FIFO queue are processed according to FIG. 5. Processes that were queued and woken up (see FIG. 4) only receive the write lock if a new process that was not queued does not obtain the lock (in either read or write mode) before the woken up process obtains the lock. Processing commences at 500 whereupon a check is made as to whether the lock is available (decision 505). If the lock is available, "yes" branch 508 is taken to acquire and use the write lock. The lock owner in the lock control structure is set (step 515) to the writer's process id (i.e. thread id). The writer with a write lock now writes to the shared resource (step 520). When finished writing, the writing process releases its write lock (step 525). The queue processing manager is called (predefined process 528) in order to process the next item from the queue now that the lock is available (see FIG. 4 for processing details). A decision is made as to whether the writer that just released the lock had its priority boosted while it held the lock (decision 530). If another write requestor with a higher priority requested the lock while the writer held the lock, the writer's priority is boosted in order for the writer to finish its use of the lock faster and release the lock for the high priority writer (see steps 555 to 560 for further boosting details). If the writer's priority was boosted, decision 530 branches to "yes" branch 532 whereupon the writer's priority is unboosted if it is appropriate to do so (step 535). One reason it may not be appropriate to unboost the writer's priority is if the writer holds additional write locks. If this is the case, it may be more efficient to wait until all the writer's write locks are released before resetting the writer to it original priority. Another way to unboost the writer is to only unboost the writer to the extent it was boosted by writers waiting for the particular lock being released. If the writer's priority was not boosted, decision 530 branches to "no" branch 538 bypassing the unboosting step.

Returning to decision 505, if the lock is not available processing commences along "no" branch 542. The read mode flag within the lock control structure is checked to determine whether it is set (decision 545). If the read mode flag is set (meaning one or more readers hold the lock), processing commences along "yes" branch 548. The Want Write flag within the lock control structure is set (step 550) indicating that a waiting writer exists. As will be more clearly seen in FIG. 6, the Want Write flag prevents some new readers from joining the read lock. Returning to decision 545, if the read mode flag is not set (indicating that a writer holds the lock), "No" branch 552 is taken in order to possibly boost the priority of the current lock owner. If the requestor's priority is greater than the current lock owner's priority, decision 555 branches to "yes" branch 548 in order to speed up the current lock owner. One way that the current lock owner can be sped up is by increasing its priority (step 560). Further, one way of increasing the current lock owner's priority is by giving it the higher priority held by the requestor. Another way the lock owner's speed could be increased is by giving it a temporary time slice exemption so that its execution would not be time sliced while writers are waiting for the lock. The time slice exemption could be for the entire time the writer holds the lock, or could be for a set number of processor clock cycles (i.e. an exemption for 1 or 2 clock cycles). Regardless of whether decision 545 branches to "yes" branch 548 or "no" branch 552, the requestor will be added to the queue (step 565) and put to sleep (step 570). Finally, the writer requestor's processing completes at end 590.

Figure 6:
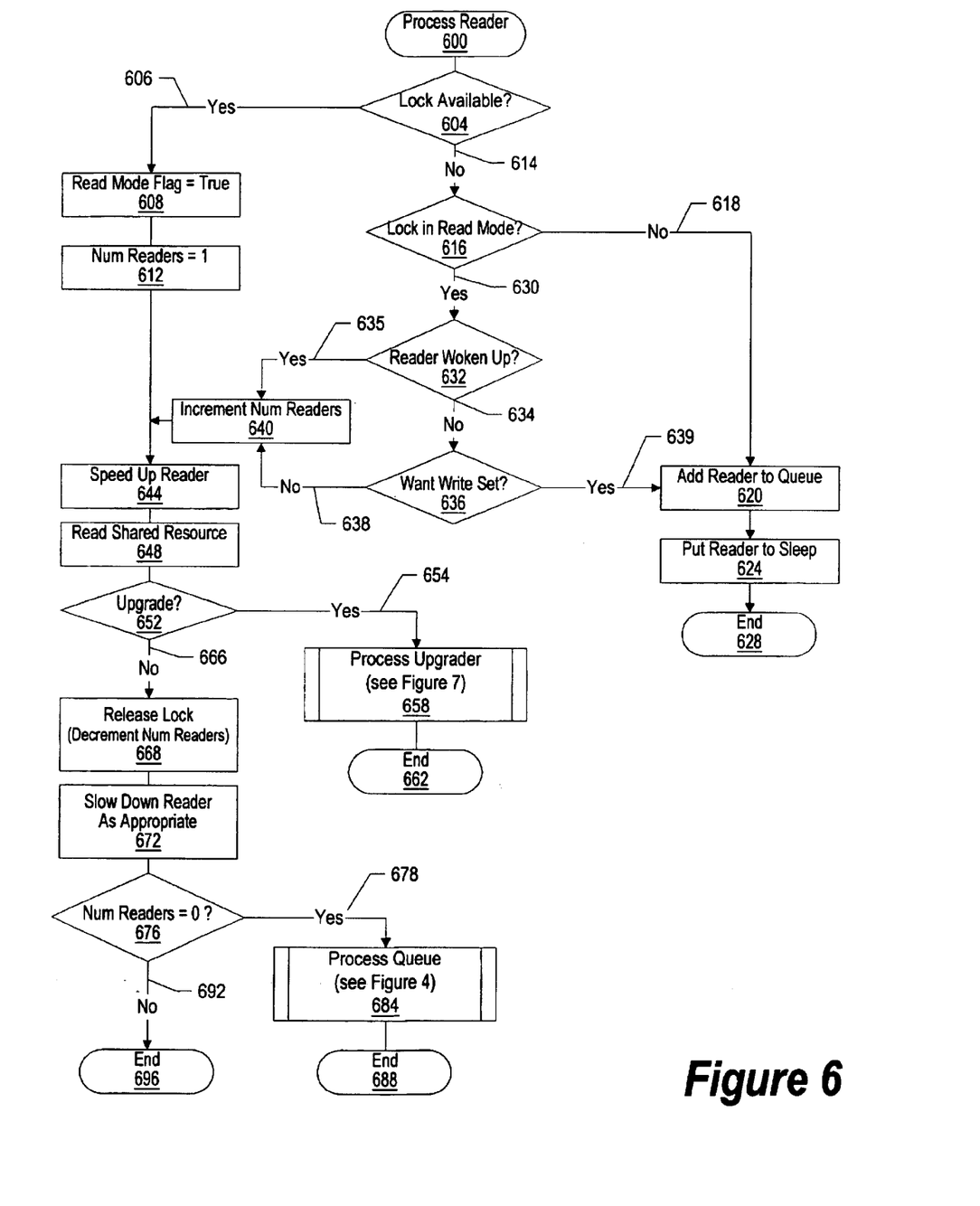
FIG. 6 is a flowchart for handling processes requesting to read from the shared resource.

FIG. 6 is a flowchart for handling processes requesting to read from the shared resource. Again, it should be pointed out that both new requests for a read lock and those that have been awakened from the lock control FIFO queue are processed according to FIG. 6. Processes that were queued and woken up (see FIG. 4) only receive the read lock if a new process that was not queued did not obtain the lock (in write mode) before the woken up process requests the lock. Processing commences at 600 whereupon a check is made to determine whether the lock is available (decision 604). If the lock is available, (i.e. this is the first reader to request the lock) decision 604 branches to "yes" branch to process the reader. The read lock is initialized by setting the read mode flag within the lock control structure (step 608) and then initializing the number of readers field within the lock control structure to one (step 612).

Returning to decision 604, if the lock is not available, "no" branch 614 is taken whereupon a check is made to determine whether the lock is already held in read mode (decision 616). If the lock is already held in read mode, decision 616 branches to "yes" branch 630 whereupon another decision is made to determine whether this read requestor was woken up from the lock control FIFO queue (decision 632). If the read requestor was woken up, decision 632 branches to "yes" branch 635 in order to allow the read requestor to join in using the read regardless of whether the Want Write flag within lock control structure has been set. Net system efficiency is improved in letting the awakened read requestor take part in the read lock rather than going back to sleep and going back on the FIFO queue. If the reader was not woken up, decision 632 branches to "no" branch 634 whereupon another decision is made as to whether the Want Write flag within the lock control structure has been set by a waiting write requestor (decision 636). If the Want Write flag has not been set, decision 636 branches to "no" branch 638 so that the read requestor can take part in the read lock. If either the reader was woken up (decision 632) or the Want Write flag has not been set (decision 636), the number of readers is incremented by one (step 640).

If the lock is available (decision 604), the reader was woken up (decision 632) or the Want Write flag has not been set (decision 636), read processing commences. In one embodiment, the reader is sped up (step 644) to prevent slow readers from keeping the lock from high priority processes. One way that the read process can be sped up is by giving it a temporary time slice exemption so that its execution would not be time sliced while writers are waiting for the lock. The time slice exemption could be for the entire time the writer holds the lock, or could be for a set number of processor clock cycles (i.e. an exemption for 1 or 2 clock cycles). Another way the lock owner's speed could be increased is by increasing its priority. The reader is able to read from the shared resource (step 648).

If the reader reads the shared resource and determines that it would like to atomically upgrade the shared resource (i.e. change its read lock to a write lock), decision 652 branches to "yes" branch 654 whereupon upgrader processing is initiated (predefined process 658) whereupon the reader's read processing ends at end 662.

On the other hand, if the reader does not decide to become an upgrader, decision 652 branches to "no" branch 666 whereupon the lock is released and the number of readers holding the lock is decremented by one (step 668). If the reader was sped up, it may need to be slowed down to its original speed that it had before obtaining the read lock (step 672). One reason it may not be appropriate to slow down the reader is if the reader holds additional read locks. If this is the case, it may be more efficient to wait until all the reader's read locks are released before slowing the reader down. In addition, if the reader received a temporary speed increase (i.e. allowing a temporary time slice exemption), then the temporary speed increased may have elapsed and the reader may already be at its original speed.

A check is made to determine whether the reader that just released its read lock was the last reader participating in the lock (decision 676). If there are no more readers, decision 676 branches to "yes" branch 678 whereupon the queue processing manager is called (predefined process 684) in order to process the next item from the queue now that the lock is available (see FIG. 4 for processing details) and processing ends at end 688. On the other hand, if other processes still are using the read lock, decision 676 branches to "no" branch 692 whereupon processing ends at end 696 without invoking the queue manager.

Returning to decision 616 and decision 636, if either (i) the lock is held in write mode causing "no" branch 618 to be taken from decision 616; or (ii) the Want Write flag has been set (and the requestor was not woken up to use the lock) causing "yes" branch 639 to be taken, then the read requestor is added to the queue (step 620), and the read requestor is put to sleep (step 624) before processing terminates at end 628. If the current lock holder has a lower priority that the read requestor, the current lock holder's priority can be boosted before processing terminates at 628 (see FIG. 5, steps 555 through 560 for an example of priority boosting).

Figure 7:
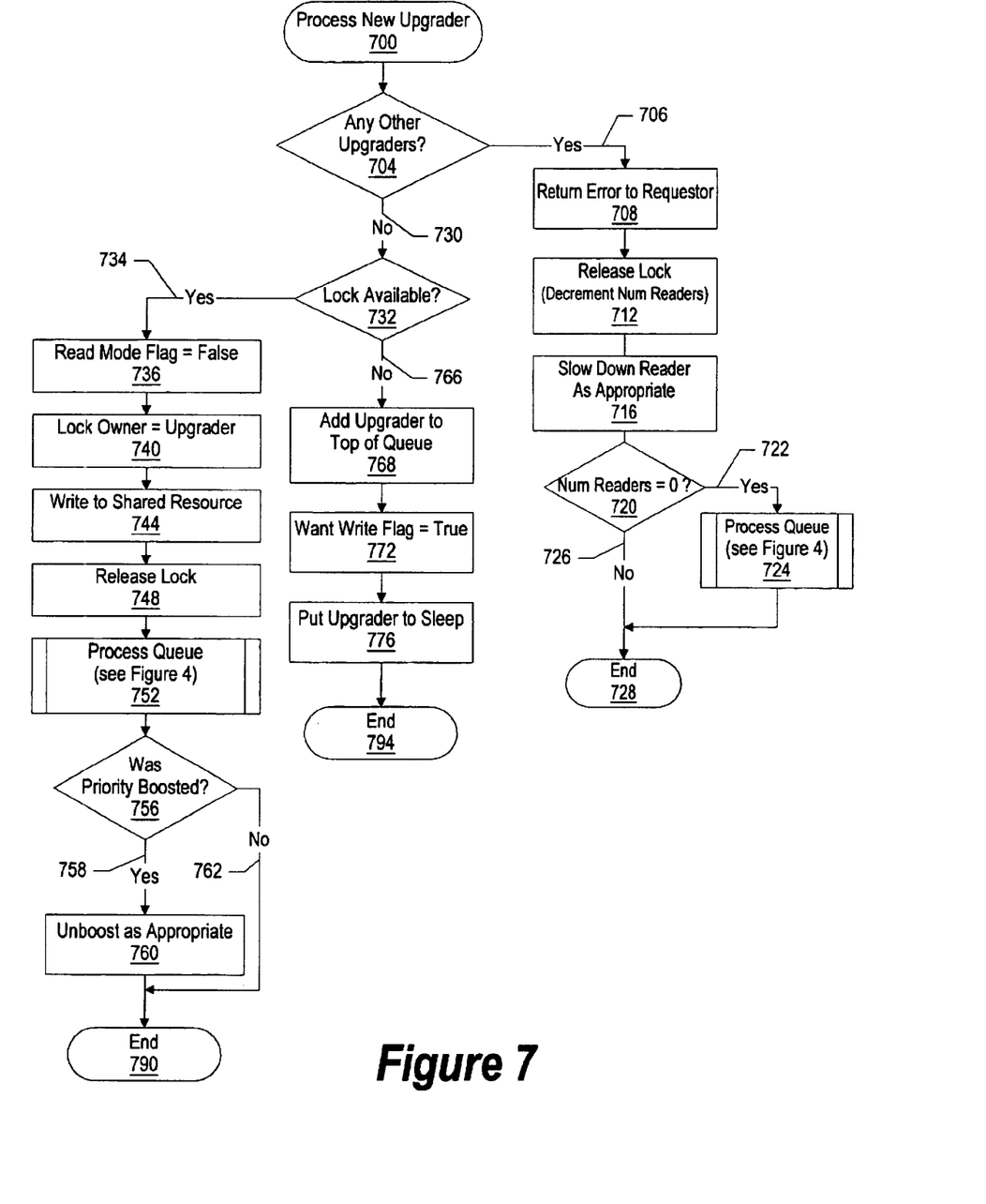
FIG. 7 is a flowchart for handling processes requesting to upgrade their current read access to the shared resource to write access.

FIG. 7 is a flowchart for handling processes requesting to be a writer of the shared resource. Processes that had a read lock to the shared resource and decide to atomically upgrade the resource invoke upgrade processing (see FIG. 6, step 658). Upgrader processing commences at 700 whereupon a decision is made whether there are any other processes (besides the current requestor) wishing to atomically upgrade the shared resource (decision 704). Because only one process can atomically upgrade the shared resource, if the requestor is not the first requestor, then "yes" branch 706 is taken. If "yes" branch 706 is taken, an error is returned to the upgrade requestor (step 708) and the upgrade requestor's read lock is taken away, decrementing the number of readers (step 712). If the upgrade requestor was sped up while it was a reader, it may need to be slowed down to its original speed that it had before obtaining the read lock (step 716). One reason it may not be appropriate to slow down the upgrade requestor is if the upgrade requestor holds additional read locks. If this is the case, it may be more efficient to wait until all the upgrade requestor's read locks are released before slowing the upgrade requestor down. In addition, if the upgrade requestor received a temporary speed increase (i.e. allowing a temporary time slice exemption), then the temporary speed increased may have elapsed and the upgrade requestor may already be at its original speed.

A check is made to determine whether the upgrade requestor that just released its read lock was the last reader participating in the lock (decision 720). If there are no more readers, decision 720 branches to "yes" branch 722 whereupon the queue processing manager is called (predefined process 724) in order to grant the earlier upgrade request now that the lock is available (see FIG. 4 for processing details). On the other hand, if other processes still are using the read lock, decision 720 branches to "no" branch 726. In either case, processing terminates at end 728.

Returning to decision 704, if there are no other upgrade requestors, then the current requestor will be allowed to atomically upgrade the resource and "no" branch 730 is taken. A check is made to determine whether the lock is currently available (decision 732). The lock would be currently available if the upgrade requestor is the only process holding the read lock (i.e. num readers=1). If this is the case, "yes" branch 734 is taken whereupon the read mode flag within the lock control structure is cleared (step 736). The lock owner field within the lock control structure is set to the upgrader's process id (step 740). The upgrader is then able to write data to the shared resource (step 744). When the upgrader is finished writing data, it releases its lock (step 748) whereupon the queue processing manager is called (predefined process 752) in order to process the next item from the queue now that the lock is available (see FIG. 4 for processing details). A decision is made as to whether the upgrader had its priority boosted while it held the lock (decision 756). If another write requestor with a higher priority requested the lock while the upgrader held the lock, the upgrader's priority is boosted in order for the upgrader to finish its use of the lock faster and release the lock for the high priority writer (see FIG. 5, steps 555 to 560 for further boosting details). If the upgrader's priority was boosted, decision 756 branches to "yes" branch 758 whereupon the upgrader's priority is unboosted if it is appropriate to do so (step 760). One reason it may not be appropriate to unboost the upgrader's priority is if the upgrader holds additional write locks. If this is the case, it may be more efficient to wait until all the upgrader's write locks are released before resetting the upgrader to its original priority. Another way to unboost the upgrader is to only unboost the upgrader to the extent it was boosted by writers waiting for the particular lock being released. If the upgrader's priority was not boosted, decision 756 branches to "no" branch 762 bypassing the unboosting step. The new upgrader processing terminates at end 790.

Returning to decision 732, if the lock is not available, "no" branch 766 is taken whereupon the upgrader is added (step 768) to the top of the (otherwise) FIFO queue that is managed by the queue manager (see FIG. 4). Because the lock is being held in read mode, the Want Write flag is set (step 772) to prevent new readers from joining the read lock. The upgrader is put to sleep (step 776) and processing terminates at end 794.

Figure 8:
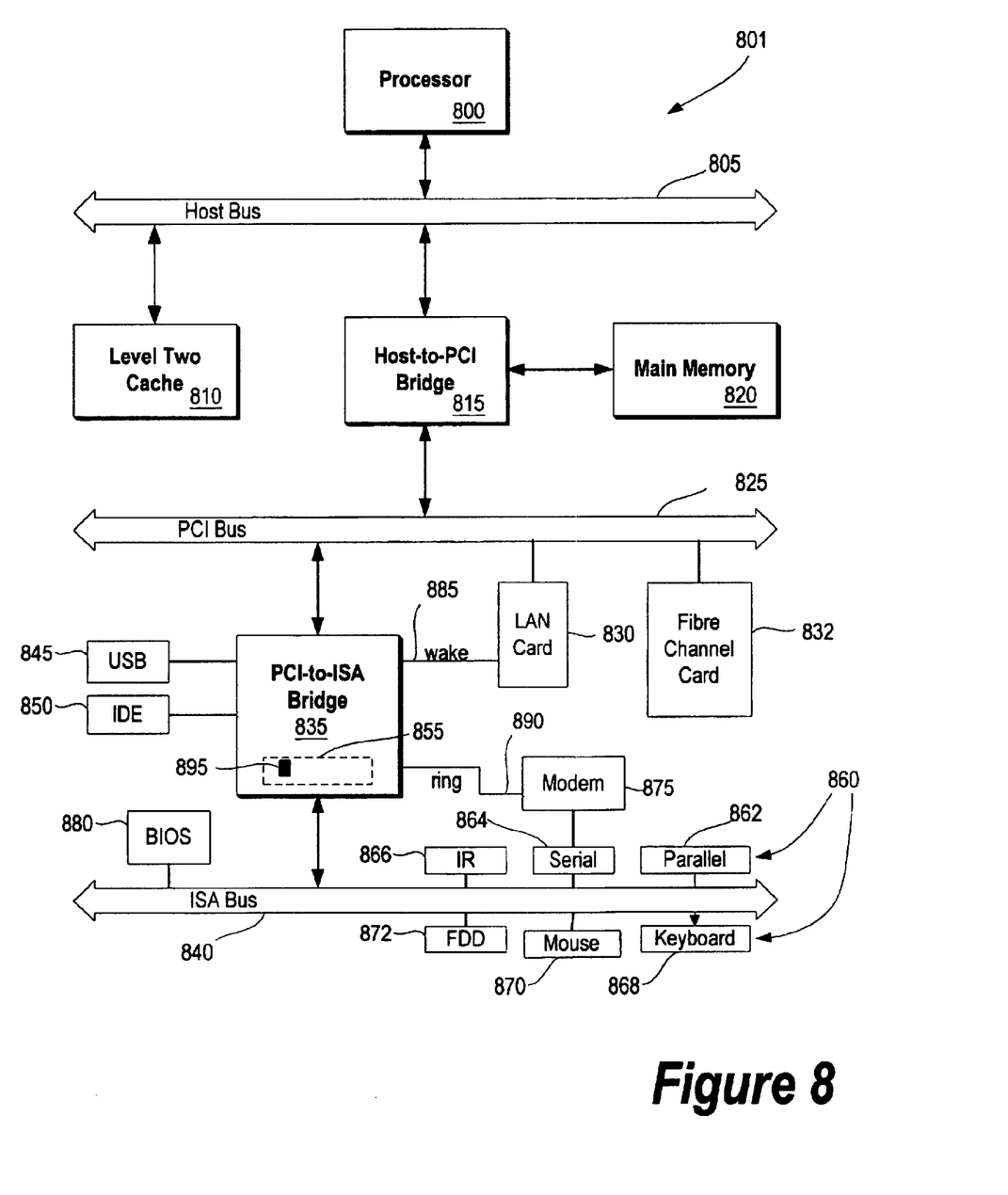
FIG. 8 is a block diagram of an information handling system capable of implementing the present invention.

FIG. 8 illustrates information handling system 801 which is a simplified example of a computer system capable of performing the present invention. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (FDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 another computer system to copy files over a network, LAN card 830 is coupled to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of managing a shared resource accessed through a resourse lock, said method comprising:
   determining whether a process identifier included in a queue corresponds to a read requestor or a write requestor;
   allowing the write requestor to write to the shared resource in response to the process identifier corresponding to the write requestor;
   allowing one or more successive read requestors to read from the shared resource in response to the process identifier corresponding to one of the read requestors; and
   speeding up processing for one or more of the read requestors that acquire the resource lock, wherein the speeding up processing includes granting one or more read requestors a temporary time slice exemption.

2. The method as described in claim 1 further comprising:
   setting the resource lock in an available mode;

setting the resource lock in a read mode in response to the first of the one or more read requestors accessing the available resource lock; and granting each of the read requestors read access to the resource lock.

3. The method as described in claim 1 further comprising:

setting a write wanted flag in response to a write requestor requesting the resource lock after the resource lock has been set in read mode;

requesting lock access by one or more read requestors, the requesting occurring after the write wanted flag is set;

granting lock access to a first group of the read requestors in response to the first group being included in the one or more successive read requestors; and denying lock access to a second group of the read requestors in response to the second group not being included in the one or more successive read requestors.

4. The method as described in claim 3 further comprising:

setting a woken up flag for each read requestor included in the first group.

5. The method as described in claim 1 further comprising:

releasing the resource lock; and granting a requesting process ownership of the resource lock, wherein the requesting process is the first process to request the resource lock after the releasing.

6. The method as described in claim 5 wherein the requesting process does not correspond with any of the process identifiers included in the queue.

7. The method as described in claim 5 wherein the requesting process corresponds with one of the process identifiers included in the queue.

8. The method as described in claim 1 further comprising:

identifying an upgrader in the queue; and granting the upgrader a write lock to the shared resource.

9. The method as described in claim 8 further comprising:

boosting a priority of the upgrader prior to the upgrader writing to the shared resource.

10. An information handling system comprising:

one or more processors;

a memory accessible by the processors;

one or more shared resources accessed through a resource lock;

a nonvolatile storage device accessible by the processors; and a shared resource manager, the shared resource manager including:

means for determining whether a process identifier included in a queue corresponds to a read requestor or a write requestor;

means for allowing the write requestor to write to the shared resource in response to the process identifier corresponding to the write requestor;

means for allowing one or more successive read requestors to read from the shared resource in response to the process identifier corresponding to one of the read requestors; and means for speeding up processing for one or more of the read requestors that acquire the resource lock, wherein the means for speeding up processing includes granting one or more read requestors a temporary time slice exemption.

11. The information handling system as described in claim 10 further comprising:

means for setting the resource lock in an available mode;

means for setting the resource lock in a read mode in response to the first of the one or more read requestors accessing the available resource lock; and means for granting each of the read requestors read access to the resource lock.

12. The information handling system as described in claim 10 further comprising:

means for setting a write wanted flag in response to a write requestor requesting the resource lock after the resource lock has been set in read mode;

means for requesting lock access by one or more read requestors, the requesting occurring after the write wanted flag is set;

means for granting lock access to a first group of the read requestors in response to the first group being included in the one or more successive read requestors; and means for denying lock access to a second group of the read requestors in response to the second group not being included in the one or more successive read requestors.

13. The information handling system as described in claim 10 further comprising:

means for releasing the resource lock; and means granting a requesting process ownership of the resource lock, wherein the requesting process is the first process to request the resource lock after the releasing.

14. The information handling system as described in claim 13 wherein the requesting process does not correspond with any of the process identifiers included in the queue.

15. The information handling system as described in claim 13 wherein the requesting process corresponds with one of the process identifiers included in the queue.

16. The information handling system as described in claim 10 further comprising:

means for identifying an upgrader in the queue; and means for granting the upgrader a write lock to the shared resource.

17. The information handling system as described in claim 16 further comprising:

means for boosting a priority of the upgrader prior to the upgrader writing to the shared resource.

18. A computer program product for managing a shared resource, said computer program product comprising:

means for determining whether a process identifier included in a queue corresponds to a read requestor or a write requestor;

means for allowing the write requestor to write to the shared resource in response to the process identifier corresponding to the write requestor;

means for allowing one or more successive read requestors to read from the shared resource in response to the process identifier corresponding to one of the read requestors; and means for speeding up processing for one or more of the read requestors that acquire the resource lock, wherein the means for speeding up processing includes granting one or more read requestors a temporary time slice exemption.

19. The computer program product as described in claim 18 further comprising:

means for setting the resource lock in an available mode;

means for setting the resource lock in a read mode in response to the first of the one or more read requestors accessing the available resource lock; and means for granting each of the read requestors read access to the resource lock.

20. The computer program product as described in claim 18 further comprising:

means for setting a write wanted flag in response to a write requestor requesting the resource lock after the resource lock has been set in read mode;

means for requesting lock access by one or more read requestors, the requesting occurring after the write wanted flag is set;

means for granting lock access to a first group of the read requestors in response to the first group being included in the one or more successive read requestors; and means for denying lock access to a second group of the read requestors in response to the second group not being included in the one or more successive read requestors.

21. The computer program product as described in claim 20 further comprising:

means for setting a woken up flag for each read requestor included in the first group.

22. The computer program product as described in claim 18 further comprising:

means for releasing the resource lock; and means for granting a requesting process ownership of the resource lock, wherein the requesting process is the first process to request the resource lock after the releasing.

23. The computer program product as described in claim 22 wherein the requesting process does not correspond with any of the process identifiers included in the queue.

24. The computer program product as described in claim 22 wherein the requesting process corresponds with one of the process identifiers included in the queue.

25. The computer program product as described in claim 18 further comprising:

means for identifying an upgrader in the queue; and means for granting the upgrader a write lock to the shared resource.

26. The computer program product as described in claim 25 further comprising:

means for boosting a priority of the upgrader prior to the upgrader writing to the shared resource.

* * * * *

UNITED STATES PATENT AND TRADEMARK OFFICE
CERTIFICATE OF CORRECTION

PATENT NO. : 6,910,212 B2
DATED : June 21, 2005
INVENTOR(S) : Brenner et al.

It is certified that error appears in the above-identified patent and that said Letters Patent is hereby corrected as shown below:

Title page,
Item [56], References Cited, U.S. PATENT DOCUMENTS, please add the following:
-- 6,041,384 A * 3/2000 Waddington et al. ............... 710/200
   6,275,953 A * 8/2001 Vahalia et al. .................... 714/11
   6,466,978 A * 10/2002 Mukherjee et al. ............... 709/225 --.

Signed and Sealed this

Thirteenth Day of September, 2005

JON W. DUDAS
*Director of the United States Patent and Trademark Office*